April 12, 1949. J. BAILEY 2,467,107
MEANS FOR REMOVING MOLDED SLUGS FROM MOLDS
Original Filed Jan. 15, 1942 3 Sheets-Sheet 3

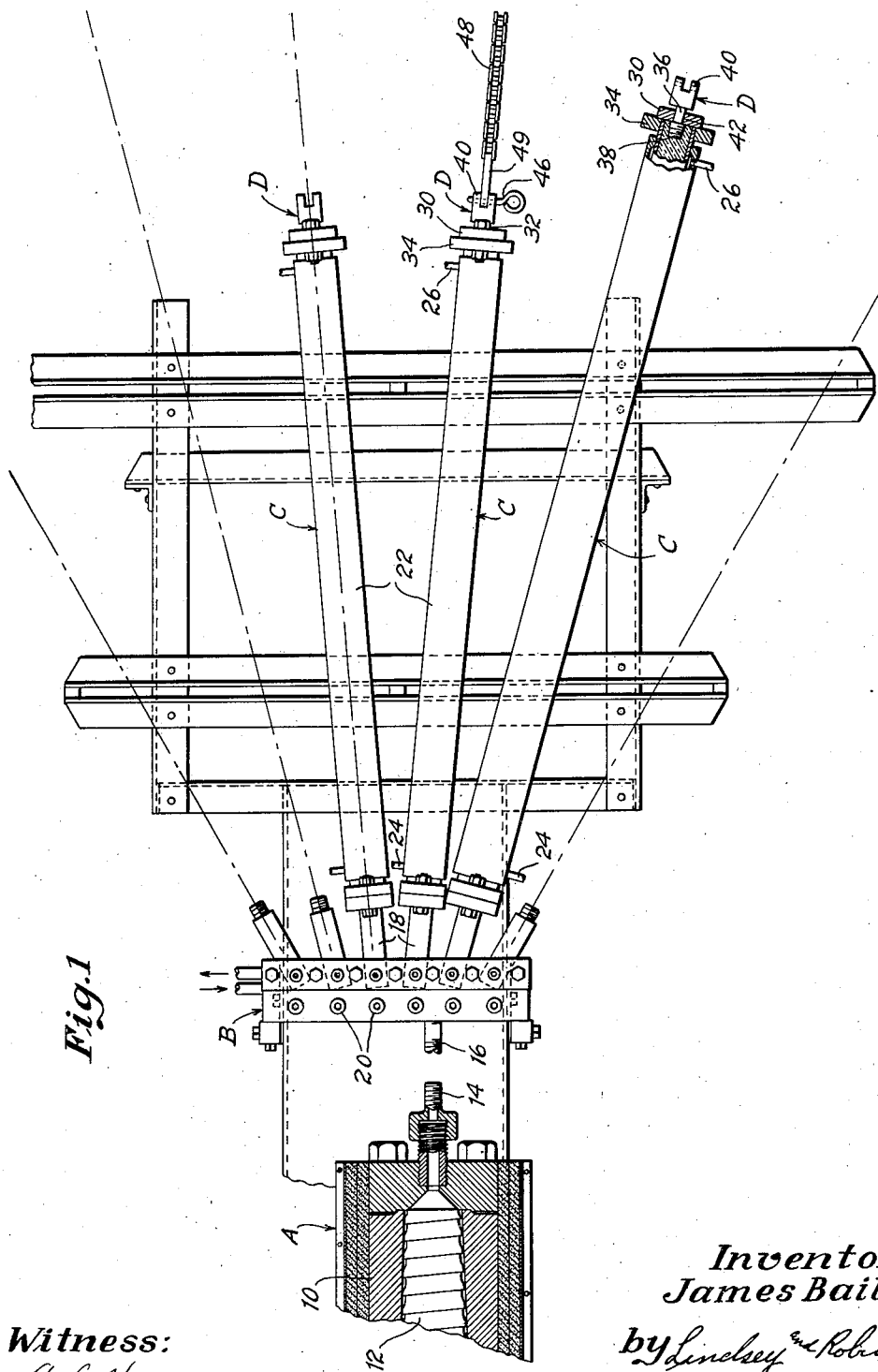

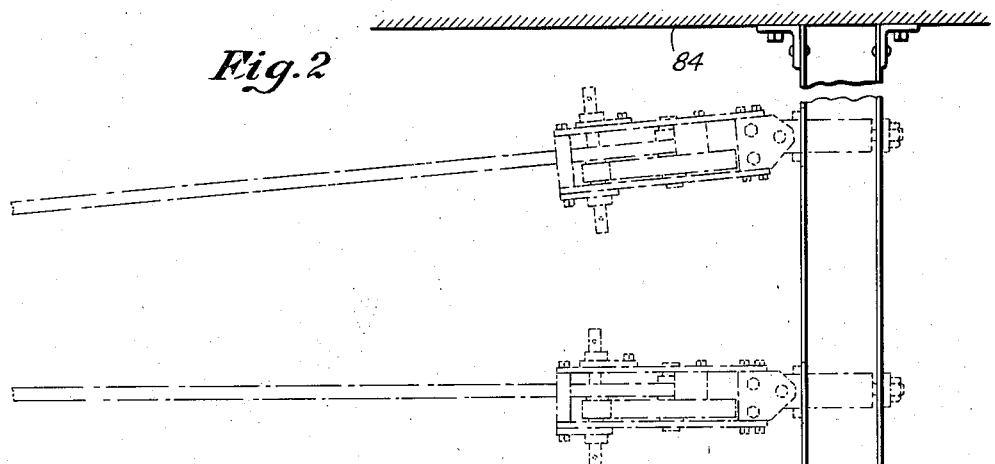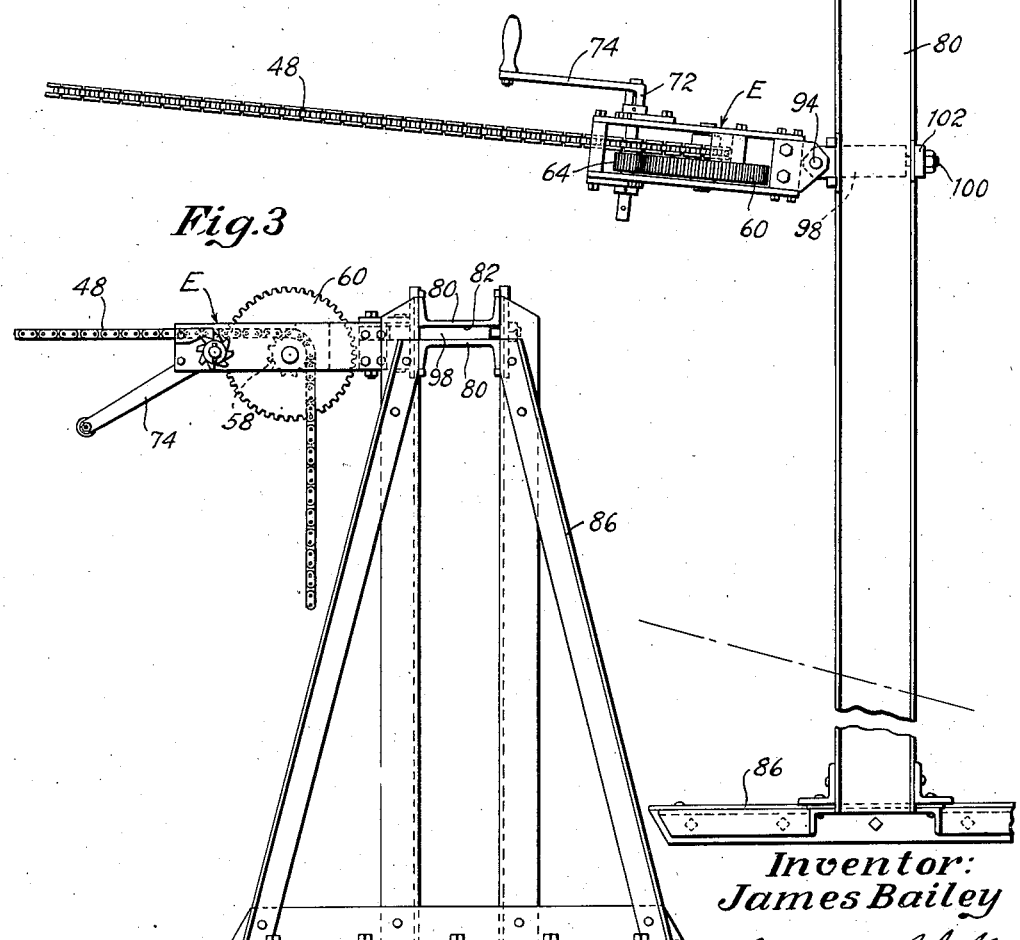

Witness:
A. A. Horn

Inventor:
James Bailey
by Lindsey and Robillard
Attorneys.

Patented Apr. 12, 1949

2,467,107

UNITED STATES PATENT OFFICE 2,467,107

MEANS FOR REMOVING MOLDED SLUGS FROM MOLDS

James Bailey, West Hartford, Conn., assignor to Plax Corporation, Hartford, Conn., a corporation of Delaware Original application January 15, 1942, Serial No. 426,814. Divided and this application May 15, 1944, Serial No. 535,596

2 Claims. (Cl. 18—1)

The present invention relates generally to the manufacture, by injection molding, of plastic objects or slugs of large cross sectional area and of considerable length, and has particular reference to means for removing the molded slugs from the molds.

The present application is a division of my application, Serial No. 426,814, filed January 15, 1942 now abandoned and entitled "Method of and apparatus for injection molding."

The aim of the invention is to provide a simplified and economical arrangement by means of which molded objects or slugs may be drawn quickly, easily and safely from the molds at the completion of the molding operations and without danger of injury to the molds or the molded slugs.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Referring to the accompanying drawings, wherein is shown one embodiment which the present invention may take:

Figure 1 is a plan view of so much of an injection molding apparatus as is necessary to illustrate the features of the present invention;

Fig. 2 is a top plan view of the power means for drawing the slugs from the molds and the support along which the power means may be adjusted; this figure, when placed to the right of Fig. 1, constituting a continuation thereof;

Fig. 3 is an end view of the structure shown in Fig. 2;

Figure 4:
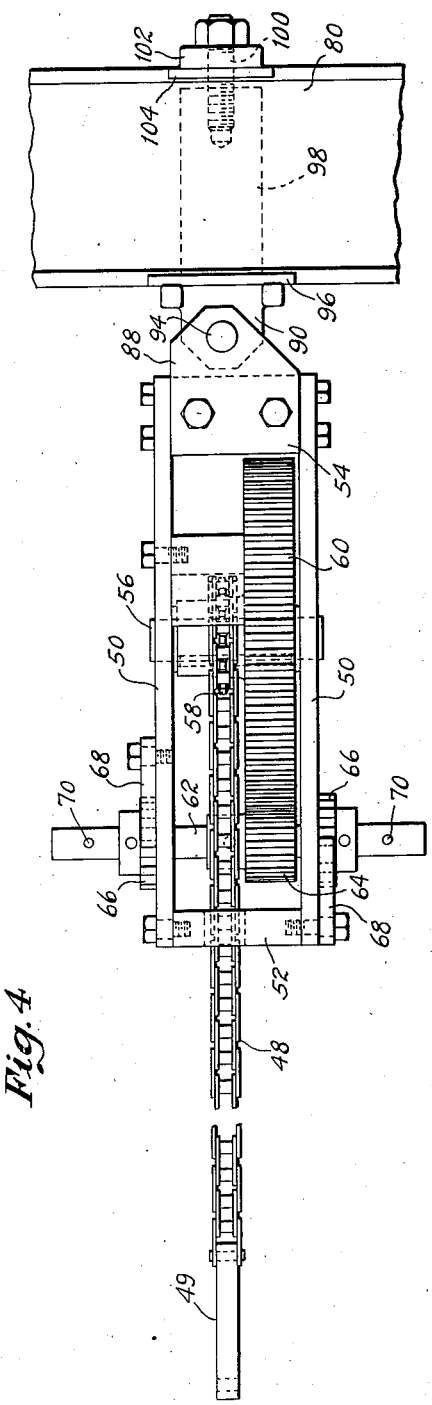
Fig. 4 is a top plan view of the power means on a somewhat larger scale.
Figure 5:
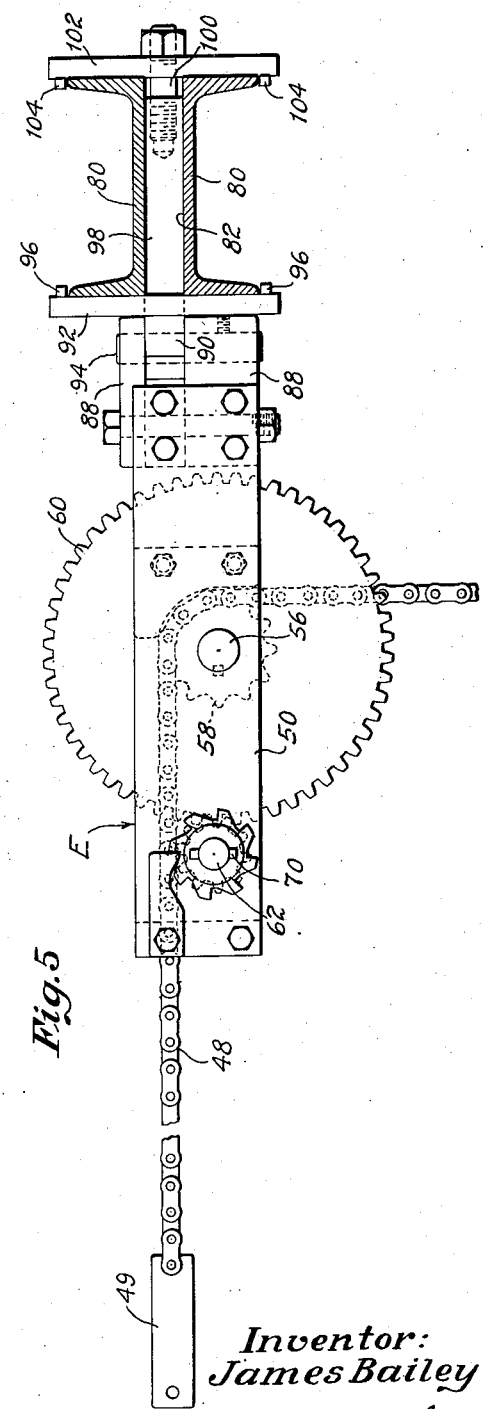
Fig. 5 is a side view of the power means shown in Fig. 4.

Referring to the drawings, the apparatus is shown as having a stuffer A, only a portion of which is illustrated, as the same may be of any suitable construction. The stuffer may be of the type having a casing 10 through which the heated plastic compound is forced by a driven screw 12. The stuffer has an outlet 14 which communicates with the inlet 16 of a distributing manifold B, which is disclosed in detail in said application Serial No. 426,814. The manifold has a distributing channel (not shown) which delivers to a plurality of outlet pipes or nipples 18 and the flow of the heated plastic material from the distributing channel to the respective nipples is controlled by shut-off valves indicated generally by the numeral 20. The molds C have their inlet ends respectively connected to the delivery ends of the nipples or pipes 18. Each of these molds is of considerable length and of relatively large cross section. Each of the molds is provided with a jacket 22 having an inlet 24 and an outlet 26 to permit the passage of fluid about the molds for the purpose of heating the same, and, if desired, for cooling them. Usually, the mold is kept hot until it is filled with the plastic material and then the mold is gradually cooled.

Due to the fact that the molds are of considerable length and are of large cross sectional area, difficulty has been experienced in removing the slugs therefrom, especially when the slugs are formed of compounds which adhere very closely to the mold wall, such, for example, as polystyrene and methyl methacrylate. The adherence of compounds of this nature to the molds is unusually strong when the compounds are injected into a hot mold.

In order to facilitate removal of the slugs from the molds, each of the molds is provided at its outer end with a removable closure member 30 with which is associated a pull member D of such character that one end thereof, during the molding operation, will become embedded and fixed in the end of the slug, but the pull member may be readily removed from the slug following the withdrawal of the slug from the mold. The closure member 30 for each mold comprises a plate which may be removably secured in place by bolts 32. These bolts pass through aligned openings in the closure plate 30 and a flange member 34 which may be screwed onto the outer end of the mold. The pull member D has a stem or pin portion 36 provided at one end with an enlarged, tapered, threaded head 38 and at its other or outer end with a yoke 40. The stem or pin portion 36 slidably extends through a centrally disposed opening 42 in the closure plate. The stem or pin 36 is longer than the thickness of the closure plate so that the pull member may have a limited longitudinal movement with respect to the closure member. The arms of the yoke 40 are provided with aligned openings adapted to receive a cross pin 46 for securing the pull member to one end of a chain 48 of a pulling device or winch E, later described more in detail. The end of the chain has a link 49 provided with a hole for receiving the cross pin.

With the pull member constructed in the manner described, the plastic, upon being forced into the mold, will form around the threaded tapered surface of the head 38 and, upon cooling, will become rigidly secured thereto. Due to the tapered conical shape of the head, the plastic will form thereon without setting up strains which might result in breakage of the slug when the latter is removed from the mold. During the molding operation, the plastic, which is, of course, forced under pressure into the mold, will press the head against the closure member 30 and thus leakage of the plastic through the hole 42 is prevented. After the molding operation has been completed, the plastic is cooled in the mold and the slug will tend to foreshorten with the result that the head 38 will be drawn inwardly, and this can take place because the stem 36 of the pull member is of sufficient length to compensate for shrinkage of the plastic material.

After the molded slug has been cooled in the mold sufficiently to retain its shape upon removal, the bolts 32 are removed, and the link 49 on the end of the chain 48 is connected to the yoke 40 by means of the cross pin 46. The power device or winch E is then operated to exert a pull on the slug longitudinally of the mold and outwardly thereof with the result that the slug is withdrawn from the mold. After the slug has been withdrawn from the mold, the pull member is removed by merely turning it so as to screw the head 38 out of the recess in which it had been embedded.

The winch E consists of a frame having side members 50 interconnected at its forward end by a cross member 52 and at its rear end by a cross member 54. The side members 50 provide supports for a transversely extending shaft 56 upon which there is carried intermediate of the side members a sprocket 58 over which the sprocket chain 48 passes, and also a relatively large gear 60; said gear and sprocket being secured to the shaft for simultaneous rotation.

Forwardly of the shaft 56 there is further carried by the side members a second shaft 62 upon which there is carried a relatively small gear 64 meshing with gear 60. The shaft 62 extends outwardly beyond the ends of the side members and carries adjacent each side member a ratchet 66 adapted to cooperate with a pawl 68 to prevent backing up of the shaft when the latter has been turned in a direction to exert a pull on the mold.

To operate the shaft 62, each end is made of rectangular cross section and has a pin 70 therethrough for cooperating with the rectangular slotted socket 72 of a crank 74. With this construction it will be seen that by rotating the shaft 62 the relatively small gear 64 will rotate the gear 60 and the sprocket 58 to exert a pull on the chain 48. Due to the mechanical advantage obtained because of the differences in the size of the gears, a tremendous pull may be exerted which will break the slugs from the molds permitting their removal. After the slugs have been removed, it will be apparent that the closure member 30 may be readily removed from the end of the slug by merely rotating the pull member D to unscrew the head 38.

In order to utilize one winch for all of the molds, the winch is carried by a slide or anchor member which is mounted for adjustment on a transversely extending track disposed generally in the plane of the molds at a distance beyond the discharge ends thereof. The track is here shown, for illustrative purposes, as comprising two horizontally arranged channel beams 80 inverted relative to one another and spaced apart so as to provide a guideway 82 therebetween. The track may be supported in any suitable manner; for example, one end may be secured to a wall 84 and the other end to a framework 86. The rear cross member 54 of the winch is provided with rearwardly extending ears 88 adapted to fit above and below an ear 90 extending forwardly from a guide plate 92 of the anchor member. The ears 88 and 90 are provided with aligned vertical openings for receiving a pivot pin 94 for pivotally mounting the winch on the anchor member. The guide plate 92 is provided with top and bottom ribs or runners 96 which are respectively adjacent the upper and lower edges of the front vertical flanges of the channel beams 80. The anchor member has a flat arm 98 extending rearwardly from the guide plate 92 and positioned within the guideway 82. The anchor member is secured in any desired position of adjustment on the track by a bolt 100 and a second guide plate 102. This second guide plate engages against the rear faces of the rear vertical flanges of the beams 80 and has top and bottom runners 104 corresponding to the runners 96. The bolt extends through a central opening in this guide plate and is screwed into the rear end of the stem or arm 98. With the arrangement described, it will be seen that the anchor member, together with the winch carried thereby, may be moved longitudinally of the track to any selected position where the winch is substantially in alignment with the mold from which the slug is to be withdrawn. This can be done by merely loosening the bolt 100, moving the anchor member to the desired position, and then securing it in the selected position by again tightening the bolt.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a mold into the forward end of which plastic material is adapted to be injected and from the outer end of which the formed plastic slug is adapted to be withdrawn, means for injecting heated plastic material into the forward end of the mold, a closure plate for closing the outer end of the mold and having a central opening, means for removably clamping said plate against the outer end of the mold, and a pull member carried by said plate and having a pin slidably mounted in and of longer length than said hole in the closure member, a tapered threaded head on the inner end of said pin and about which the plastic material is adapted to be molded, and a coupling member on the outer end of said pin for connection to power means.

2. In combination, a mold into the forward end of which plastic material is adapted to be injected and from the outer end of which the formed plastic slug is adapted to be withdrawn, means for injecting heated plastic material into the forward end of the mold, a removable closure device for the outer end of the mold, and a slug engaging member extending into said mold through an opening in said device and axially movable with respect thereto, said member having an inner portion adapted to be imbedded in the molten plastic when the same is injected into the mold and being free to move inwardly during subsequent cooling and shrinkage of the slug to retain said inner portion in said imbedded condition, said inner portion being of greater cross section than said opening whereby said portion will abut against the closure device to limit outward movement of the member and to conceal said opening when molten plastic is injected into the mold.

JAMES BAILEY.

REFERENCES CITED

The following references are of record in the file of this patent:

UNITED STATES PATENTS

| Number | Name | Date |
|---|---|---|
| Re. 10,082 | Billings | Apr. 11, 1882 |
| 730,665 | Kribs | June 9, 1903 |
| 758,865 | Shaw | May 3, 1904 |
| 1,251,175 | Boyer | Dec. 25, 1917 |
| 1,326,874 | Madbeth et al. | Dec. 30, 1919 |
| 1,944,571 | Rahm | Jan. 23, 1934 |
| 2,176,990 | Crampton | Oct. 24, 1939 |
| 2,200,042 | Salz | May 7, 1940 |
| 2,290,129 | Moreland | July 14, 1942 |

FOREIGN PATENTS

| Number | Country | Date |
|---|---|---|
| 214,559 | Great Britain | Apr. 24, 1924 |